United States Patent
Gilliland et al.

(10) Patent No.: US 11,598,412 B2
(45) Date of Patent: Mar. 7, 2023

(54) SPHERICAL MOUNTED CYLINDRICAL ROLLER BEARING SYSTEM

(71) Applicant: Textron Innovations Inc., Fort Worth, TX (US)

(72) Inventors: Colton J. Gilliland, Northlake, TX (US); Russell L. Mueller, Coppell, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 196 days.

(21) Appl. No.: 17/243,267

(22) Filed: Apr. 28, 2021

(65) Prior Publication Data

US 2021/0246978 A1 Aug. 12, 2021

Related U.S. Application Data

(62) Division of application No. 16/030,063, filed on Jul. 9, 2018, now Pat. No. 11,060,605.

(51) Int. Cl.
| | |
|---|---|
| *F16H 57/08* | (2006.01) |
| *F16C 19/49* | (2006.01) |
| *F16C 33/58* | (2006.01) |
| *B64C 29/00* | (2006.01) |
| *B64C 27/12* | (2006.01) |

(52) U.S. Cl.
CPC ............ *F16H 57/08* (2013.01); *B64C 27/12* (2013.01); *B64C 29/0033* (2013.01); *F16C 19/49* (2013.01); *F16C 33/58* (2013.01); *F16C 2326/43* (2013.01); *F16C 2361/61* (2013.01); *F16H 2057/085* (2013.01)

(58) Field of Classification Search
CPC ........... B64C 2027/125; B64C 29/0033; F16C 19/48; F16C 33/58; F16C 2326/43; F16H 2057/085
USPC .......................................................... 244/60
See application file for complete search history.

(56) References Cited

U.S. PATENT DOCUMENTS

| | | | |
|---|---|---|---|
| 2,048,972 | A | 7/1936 | William |
| 3,063,133 | A | 11/1962 | Straub et al. |
| 3,635,103 | A | 1/1972 | Monti |
| 3,764,230 | A | 10/1973 | Rybicki et al. |
| 4,243,192 | A | 1/1981 | Johnson |
| 4,253,711 | A | 3/1981 | Lynn et al. |
| 4,682,512 | A | 7/1987 | Peterson |
| 4,946,354 | A | 8/1990 | Aubry et al. |
| 4,967,615 | A | 11/1990 | Mills |
| 5,433,674 | A | 7/1995 | Sheridan et al. |
| 5,455,778 | A | 10/1995 | Ide et al. |

(Continued)

OTHER PUBLICATIONS

USPTO Non-Final Office Action issued in U.S. Appl. No. 16/030,063 dated Feb. 18, 2021.

*Primary Examiner* — Christopher P Ellis
(74) *Attorney, Agent, or Firm* — Akona IP

(57) ABSTRACT

A planetary gear system is provided in one example embodiment and may include a planet gear further comprising a bearing system, the bearing system further comprising an inner bearing assembly comprising a spherical bearing and an outer race; an outer bearing assembly comprising a plurality of cylindrical roller bearings, an inner race, and an outer race; and a race element comprising an inner surface and an outer surface, wherein the outer surface of the race element is the inner race for the outer bearing assembly and the inner surface of the race element is associated with the outer race for the inner bearing assembly.

20 Claims, 9 Drawing Sheets

(56) References Cited

U.S. PATENT DOCUMENTS

| | | |
|---|---|---|
| 5,906,476 A | 5/1999 | Arlton |
| 6,223,616 B1 | 5/2001 | Sheridan |
| 8,038,539 B2 | 10/2011 | Stamps et al. |
| 2002/0186910 A1 | 12/2002 | Maret |
| 2003/0095729 A1 | 5/2003 | Post et al. |
| 2003/0222171 A1 | 12/2003 | Zoppitelli et al. |
| 2008/0218006 A1 | 9/2008 | DiMascio et al. |
| 2009/0097787 A1 | 4/2009 | Richard et al. |
| 2009/0269200 A1 | 10/2009 | Karem |
| 2010/0270421 A1 | 10/2010 | Tully, Jr. |
| 2011/0182539 A1 | 7/2011 | Kolar |
| 2012/0255782 A1 | 10/2012 | Smith et al. |
| 2013/0005528 A1 | 1/2013 | Ai et al. |
| 2013/0319150 A1 | 12/2013 | Carlton et al. |
| 2014/0314541 A1 | 10/2014 | Schwarz et al. |
| 2015/0139575 A1 | 5/2015 | Romano et al. |
| 2016/0076393 A1 | 3/2016 | Sheridan |
| 2016/0160920 A1 | 6/2016 | Karaki et al. |
| 2016/0208850 A1 | 7/2016 | Durling |
| 2016/0238069 A1 | 8/2016 | Bohm |
| 2016/0288006 A1 | 10/2016 | Shen |
| 2016/0376911 A1 | 12/2016 | Sheridan |
| 2016/0377165 A1 | 12/2016 | Sheridan |
| 2017/0305565 A1 | 10/2017 | Kooiman et al. |
| 2017/0312878 A1 | 11/2017 | Yasuda et al. |
| 2017/0320567 A1 | 11/2017 | Miller et al. |
| 2019/0257410 A1 | 8/2019 | Karlak |
| 2019/0277343 A1 | 9/2019 | Baldwin et al. |
| 2019/0380535 A1 | 12/2019 | Ullmann et al. |
| 2020/0149511 A1 | 5/2020 | Hug et al. |

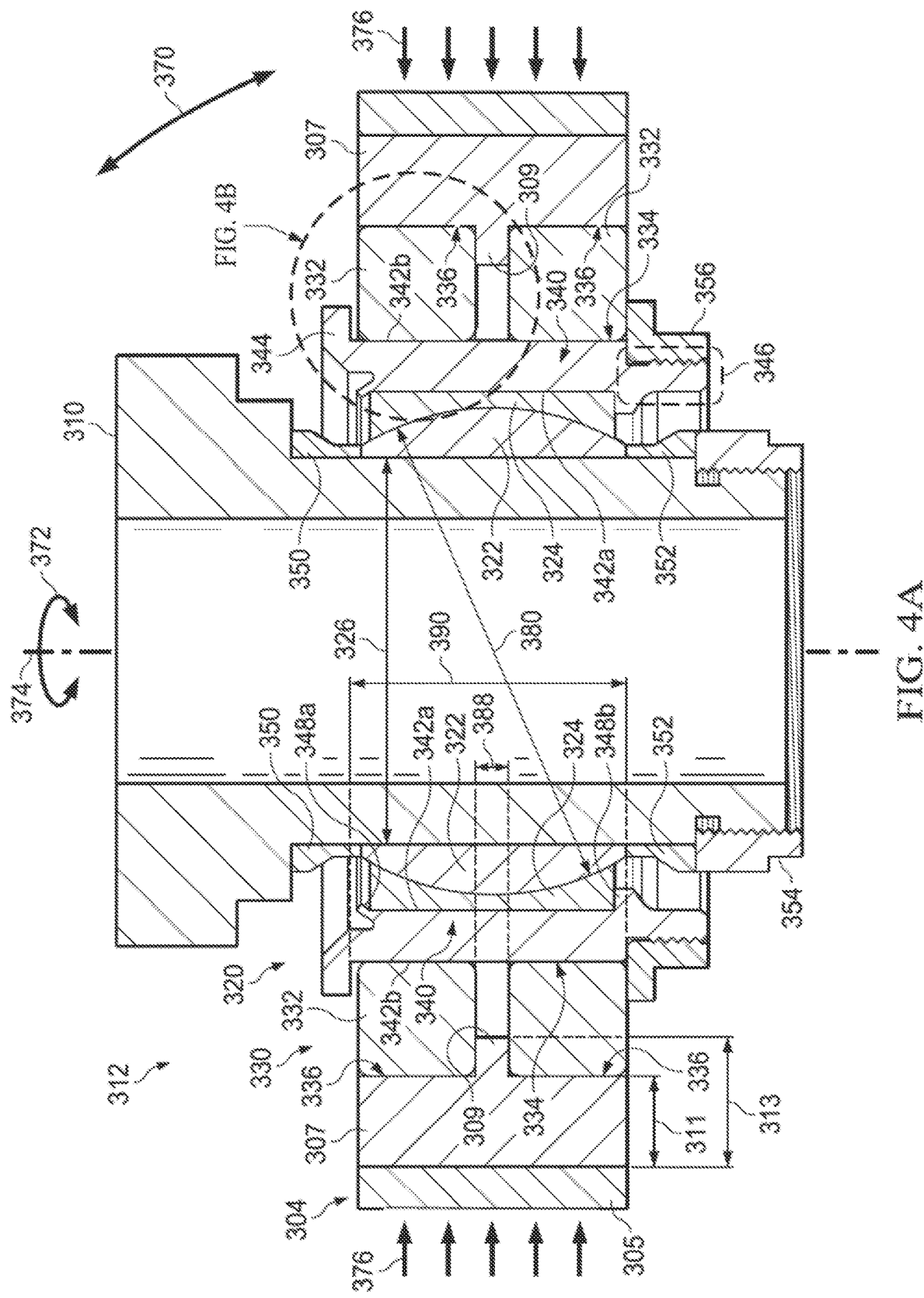

SPHERICAL MOUNTED CYLINDRICAL ROLLER BEARING SYSTEM

CROSS-REFERENCE TO RELATED APPLICATION

This application is a divisional and claims the benefit of priority under 35 U.S.C. § 120 of U.S. application Ser. No. 16/030,063, filed on Jul. 9, 2018, entitled "SPHERICAL MOUNTED CYLINDRICAL ROLLER BEARING SYSTEM," Inventors Colton J. Gilliland et al. The disclosure of the prior application is considered part of and is incorporated in its entirety by reference in the disclosure of this application.

TECHNICAL FIELD

This disclosure relates in general to the field of aircraft and, more particularly, though not exclusively, to a spherical mounted cylindrical roller bearing system.

BACKGROUND

There are numerous considerations involved in the design of tiltrotor aircraft and other aircraft, including size, weight, power efficiency, fuel efficiency, noise, vibration, structural loads, and so forth. In many cases, however, it may be challenging to improve certain aspects of an aircraft without disrupting other aspects. For example, bearing design for an aircraft propulsion system can implicate numerous performance considerations and is often an extremely challenging aspect of aircraft design.

SUMMARY

According to one aspect of the present disclosure, a bearing system may be provided and may include an inner bearing assembly comprising a spherical bearing and an outer race; an outer bearing assembly comprising a plurality of cylindrical roller bearings, an inner race, and an outer race; and a race element comprising an inner surface and an outer surface, wherein the outer surface of the race element is the inner race for the outer bearing assembly and the inner surface of the race element is associated with the outer race for the inner bearing assembly. The inner bearing assembly allows tilting movements of the bearing system and the outer bearing assembly allows rotational movements and supports, at least in part, radial loads for the bearing system. In some cases, the outer race of the inner bearing assembly can be integral with the race element. The outer race for the outer bearing assembly can be rim material of a gear.

In some cases, the race element may further include inner securing elements associated with the inner surface of the race element that secure the outer race of the inner bearing assembly to the spherical bearing; an outer shoulder associated with the outer surface of the race element that maintains alignment of the plurality of cylindrical roller bearings with the inner race of the outer bearing assembly; and an outer structural element associated with the outer surface of the race element that is to receive a retaining device. The retaining device can secure the plurality of cylindrical roller bearings to the inner race of the outer bearing assembly and the inner race of the outer bearing assembly may provide a clearance distance that allows axial movements of the plurality of cylindrical roller bearings along the inner race. The spherical bearing may have an inner diameter to facilitate mounting the bearing system on a post.

According to another aspect of the present disclosure, a planetary gear system may be provided and may include a planet gear further comprising a bearing system in which the bearing system may further include an inner bearing assembly comprising a spherical bearing and an outer race; an outer bearing assembly comprising a plurality of cylindrical roller bearings, an inner race, and an outer race; and a race element comprising an inner surface and an outer surface, wherein the outer surface of the race element is the inner race for the outer bearing assembly and the inner surface of the race element is associated with the outer race for the inner bearing assembly. The planetary gear system may further include a sun gear, a ring gear, and a carrier that includes a plurality of carrier posts, wherein the planet gear is one of a plurality planet gears of the planetary gear system and each planet gear is mounted to each carrier post of the plurality of carrier posts.

According to another aspect of the present disclosure, an aircraft may be provided and may include a fuselage; and at least one propulsion system in which the at least one propulsion system includes at least one planetary gear system and the at least one planetary gear system may further include a plurality of planet gears, wherein each planet gear further comprises a bearing system and the bearing system of each planet gear may further include an inner bearing assembly comprising a spherical bearing and an outer race; an outer bearing assembly comprising a plurality of cylindrical roller bearings, an inner race, and an outer race; and a race element comprising an inner surface and an outer surface, wherein the outer surface of the race element is the inner race for the outer bearing assembly and the inner surface of the race element is associated with the outer race for the inner bearing assembly. In some cases, the aircraft may be a tiltrotor aircraft comprising at least two propulsion systems having proprotors that are moveable between a helicopter mode and an airplane mode. In some cases, the aircraft may be a rotorcraft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

FIGS. 4A-4B are simplified diagrams illustrating example details associated with an example bearing system of an example planet gear, in accordance with certain embodiments.

DETAILED DESCRIPTION

Figure 1A:
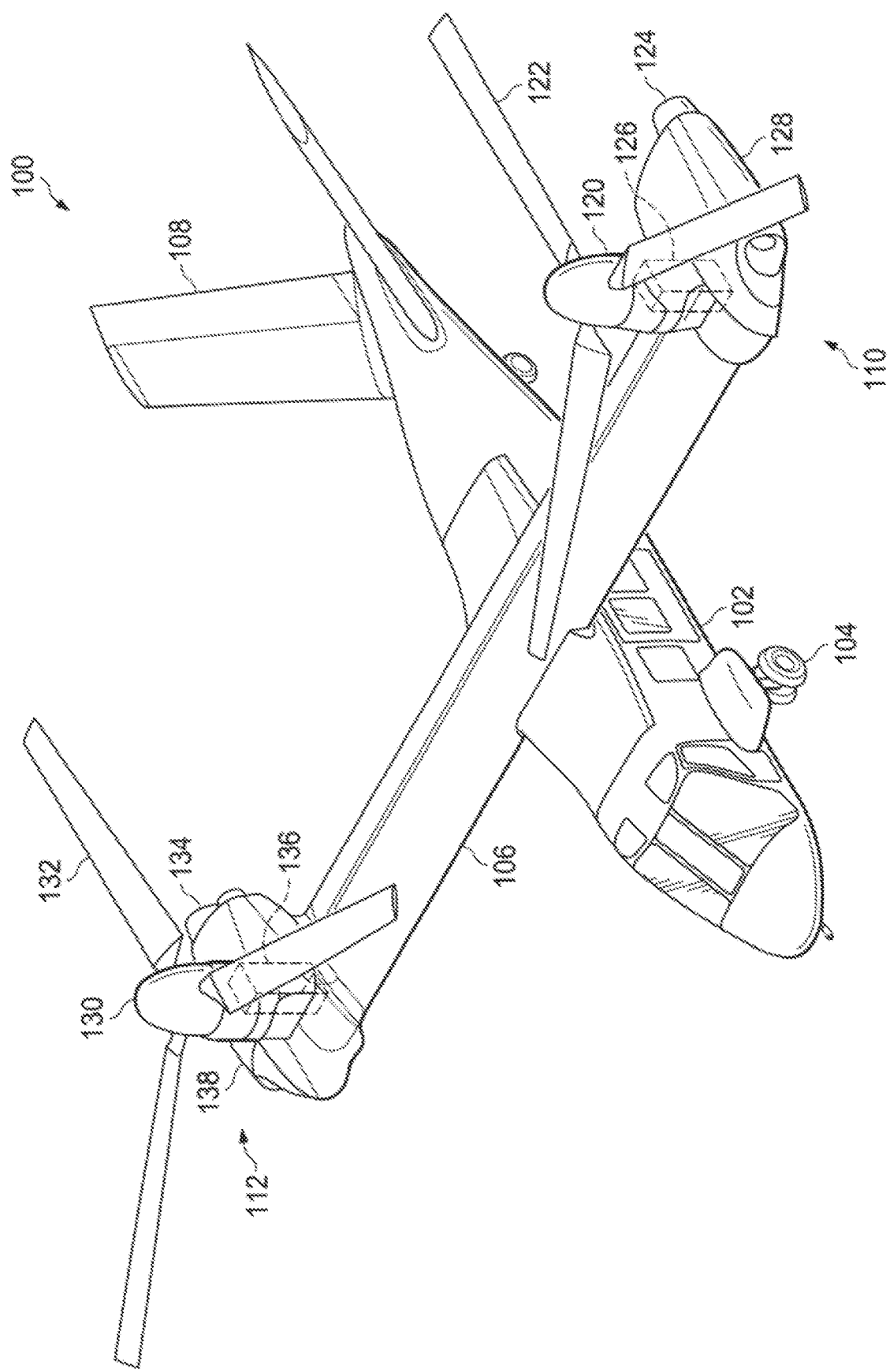
FIGS. 1A-1B and 2 are simplified schematic diagrams of example aircraft, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom', or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase 'between X and Y' represents a range that includes X and Y.

Additionally, as referred to herein in this Specification, the terms 'forward', 'aft', 'inboard', and 'outboard' may be used to describe relative relationship(s) between components and/or spatial orientation of aspect(s) of a component or components. The term 'forward' may refer to a special direction that is closer to a front of an aircraft relative to another component or component aspect(s). The term 'aft' may refer to a special direction that is closer to a rear of an aircraft relative to another component or component aspect(s). The term 'inboard' may refer to a location of a component that is within the fuselage of an aircraft and/or a spatial direction that is closer to or along a centerline of the aircraft relative to another component or component aspect, wherein the centerline runs in a between the front and the rear of the aircraft. The term 'outboard' may refer to a location of a component that is outside the fuselage of an aircraft and/or a special direction that farther from the centerline of the aircraft relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1B:
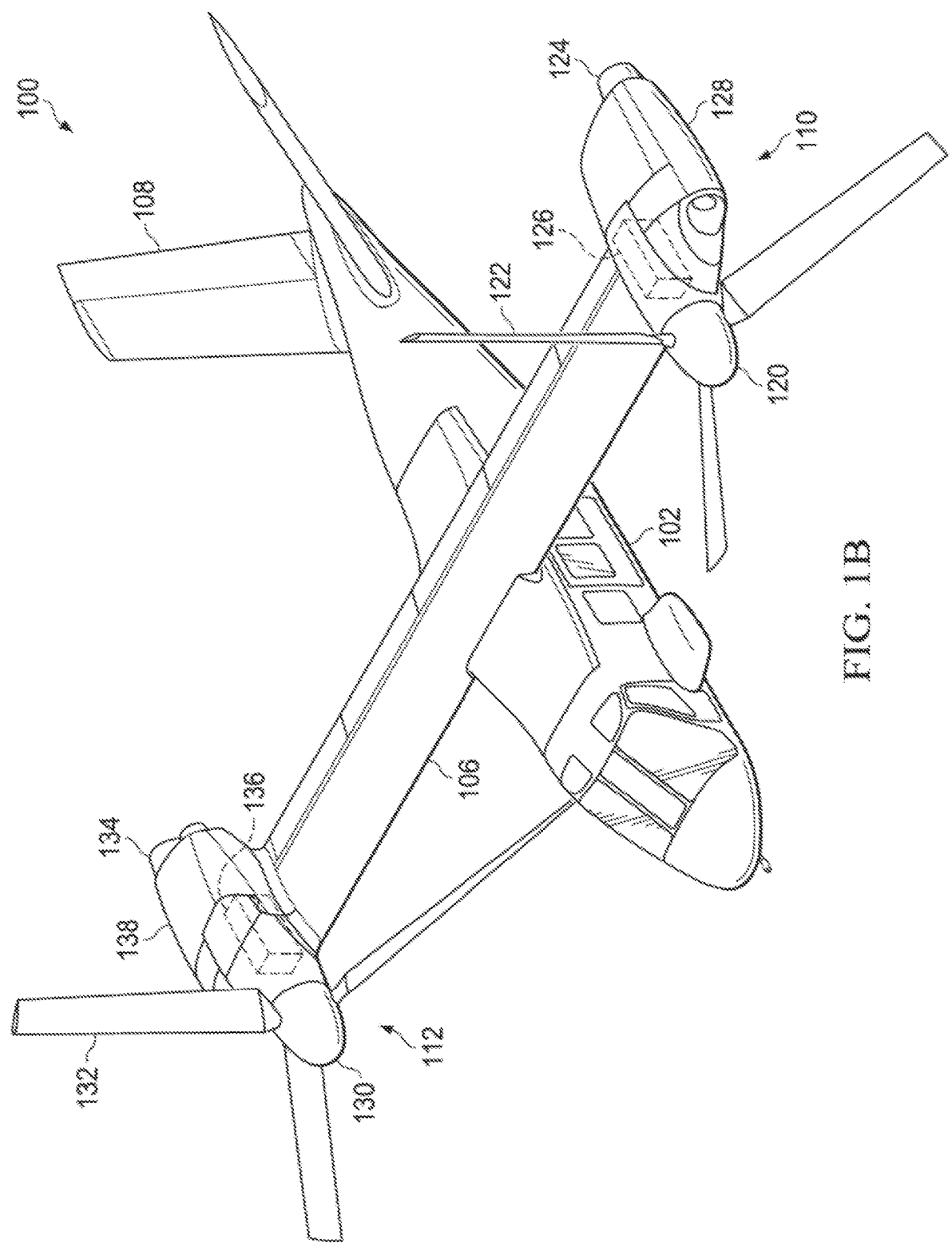

Referring to FIGS. 1A-1B, FIGS. 1A-1B illustrate perspective views of an example aircraft, which in this example is a tiltrotor aircraft 100. Tiltrotor aircraft 100 includes a fuselage 102, a landing gear 104, a wing 106, a tail member 108, a propulsion system 110, and a propulsion system 112. The fuselage 102 is the main body of the tiltrotor aircraft 100, which may include a cabin (e.g., for crew, passengers, and/or cargo) and/or may house certain mechanical and electrical components for tiltrotor aircraft 100. In the illustrated embodiment, tail member 108 may be used as a vertical stabilizer.

Propulsion system 110 includes a proprotor 120 that includes a plurality of rotor blades 122. Propulsion system 112 includes a proprotor 130 that includes a plurality of rotor blades 132. Various engine(s), gearbox(es), and drive shaft(s) may be provided in various configurations to provide torque to proprotors 120 and 130. For example, in at least one embodiment, propulsion system 110 may include an engine 124 within a nacelle 128 that is mechanically connected to a proprotor gearbox 126 to provide torque to proprotor 120 and propulsion system 112 may include an engine 134 within a nacelle 138 that is mechanically connected to a proprotor gearbox 136 to provide torque to proprotor 130 to provide flight capabilities (e.g., flight direction, thrust, and/or lift) for tiltrotor aircraft 100. The position or proprotors 120 and 130, as well as the pitch of rotor blades 122 and 132, can be selectively controlled in order to selectively control direction, thrust, and/or lift of tiltrotor aircraft 100.

The position of proprotors 120 and 130 are moveable between a helicopter mode and an airplane mode to provide different types of thrust for tiltrotor aircraft 100. FIG. 1A illustrates tiltrotor aircraft 100 in helicopter mode in which proprotors 120 and 130 are positioned substantially vertical to provide a lifting thrust. FIG. 1B illustrates tiltrotor aircraft 100 in an airplane mode in which proprotors 120 and 130 are positioned substantially horizontal to provide a forward thrust in which a lifting force is supplied by wing 106. It should be appreciated that tiltrotor aircraft can be operated such that proprotors 120 and 130 can be selectively positioned between airplane mode and helicopter mode, which can be referred to as a conversion mode.

Figure 2:
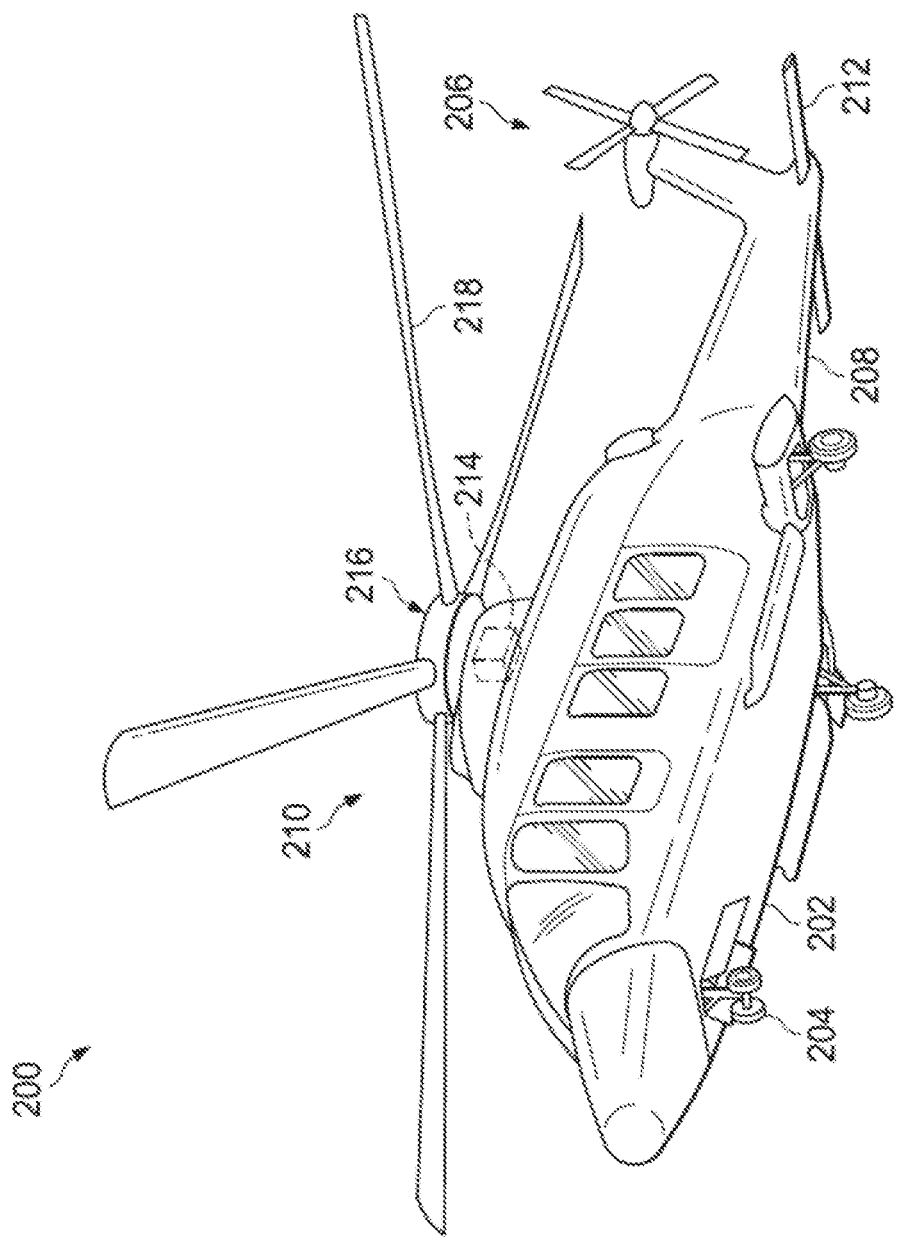

Referring to FIG. 2, FIG. 2 illustrates a side view of an example aircraft, which in this example is a rotorcraft 200. Rotorcraft 200 includes a propulsion system 210, a fuselage 202, landing gear 204, a tail rotor or anti-torque system 206, an empennage 208, and a tail structure 212. Propulsion system 210 may include one or more engines that is/are mechanically connected to a main rotor gearbox 214 to provide torque to a rotor system 216 that includes rotor blades 218 and also to provide torque to anti-torque system 206. The pitch of each rotor blade 218 can be managed or adjusted in order to selectively control direction, thrust, and lift of rotorcraft 200. The fuselage 202 is the main body of the rotorcraft, which may include a cabin (e.g., for crew, passengers, and/or cargo) and/or may house certain mechanical and electrical components (e.g., engine(s), transmission, and/or flight controls). In the illustrated embodiment, tail structure 212 may be used as a horizontal stabilizer.

Propulsion systems for aircraft, such as tiltrotor aircraft 100 and/or rotorcraft 200, can include epicyclic gear systems, such as planetary gear systems. In general, a planetary gear system for a tiltrotor aircraft, rotorcraft, etc. is a high power density gear reduction system that provides for the ability to reduce the speed of input rotations to the gear system while increasing the torque of output rotations from the gear system.

Figure 3A:
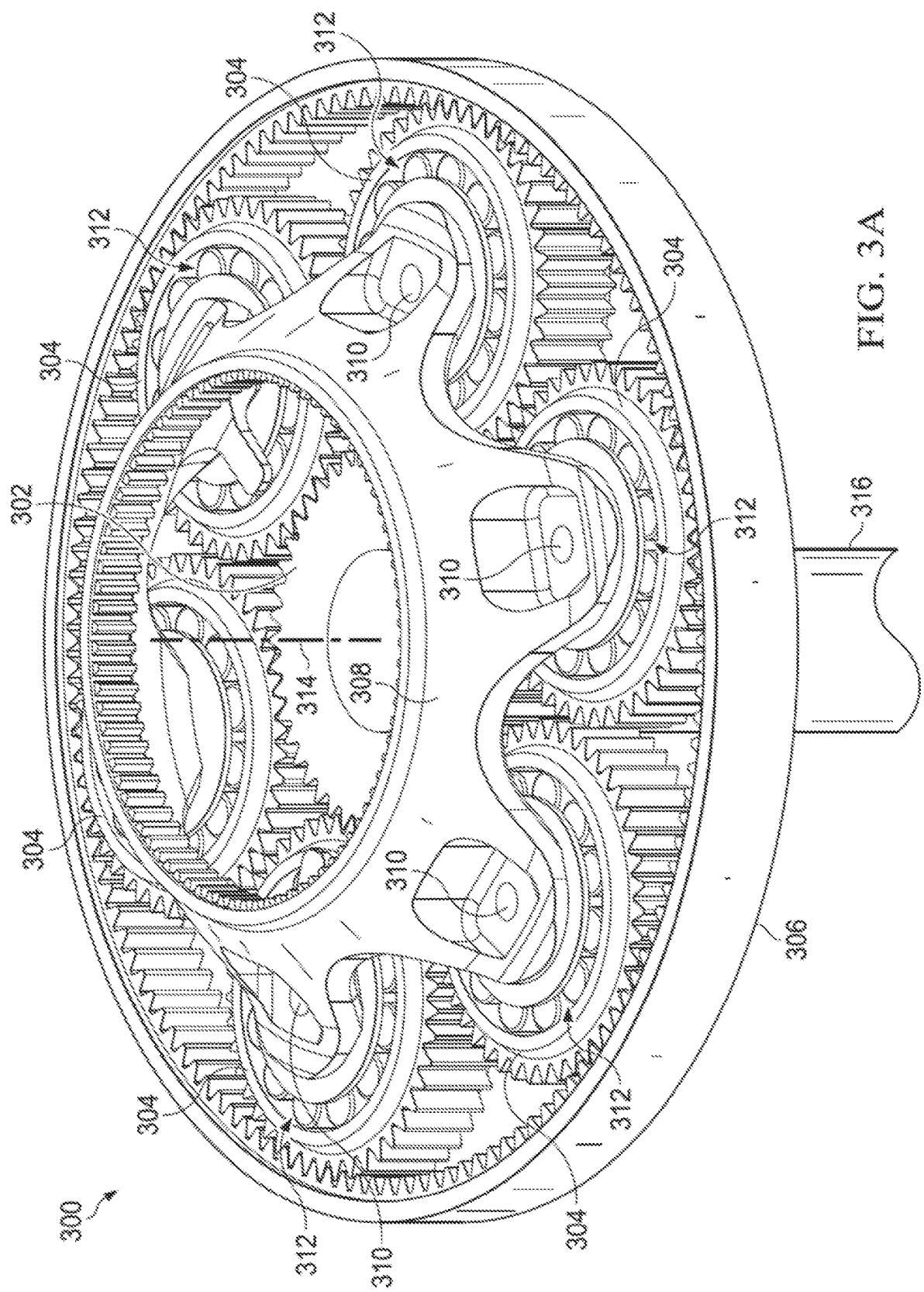
FIGS. 3A-3B are simplified diagrams illustrating example details associated with an example planetary gear system, in accordance with certain embodiments.
Figure 3B:
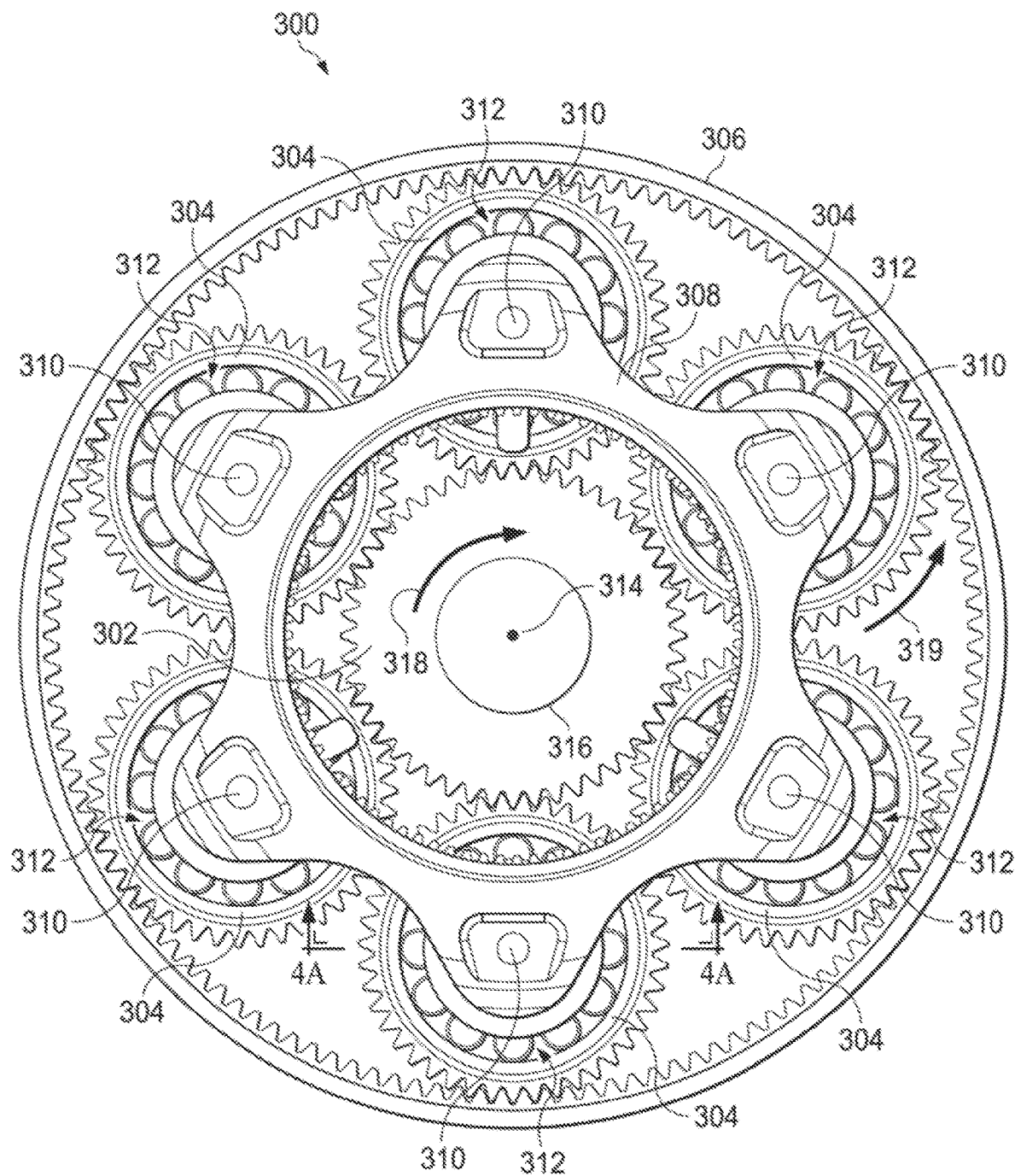

Referring to FIGS. 3A-3B, FIGS. 3A-3B are simplified schematic diagrams illustrating example details associated with an example planetary gear system 300, in accordance with certain embodiments. In at least one embodiment the planetary gear system 300 may include a sun gear 302, six planet gears 304 (sometimes referred to as pinions), a ring gear 306, and a carrier 308. Each planet gear 304 may include a spherical mounted cylindrical roller bearing system 312. Each planet gear 304 can be mounted to a carrier post 310 of carrier 308 via its bearing system 312. Although planetary gear system 300 is illustrated with six planet gears 304, the number of planet gears shown in planetary gear system 300 is provided for illustrative purposes only. It is to be understood that a planetary gear system may include any number of planet gears in accordance with embodiments described herein.

In some embodiments, carrier 308 may be mechanically coupled to a mast (not shown) of a propulsion system for an aircraft; however, in other embodiments, carrier 308 may be mechanically coupled to another gear system of a propulsion system for the aircraft, in which the carrier may provide an input torque to the other gear system.

Although the planetary gear system 300 can be operated in multiple ways by restricting rotational motion of any one of sun gear 302, ring gear 306, or carrier 308, one potential method for operating planetary gear system 300 may include allowing rotation of sun gear 302 and carrier 308 about a central axis (generally indicated as dashed-line 314) of a shaft 316 to which the sun gear 302 is mounted. In at least one embodiment, for example, with the ring gear 306 prevented from rotating about the central axis 314, a clockwise rotation (generally indicated by arrow 318) of the shaft 316 and associated sun gear 302 results in a counter-clockwise rotation (generally indicated by arrow 319) of each planet gear 304 and a clockwise rotation of the carrier 308. In this embodiment, each of the sun gear 302, the ring gear 306, and the planet gears 304 are formed as involute gears so that, when functioning under normal operating conditions and without failure of any of the gears, contact between two gear teeth occurs along a single line of action (or pressure line of contact).

While a single line of action is desirable between gear teeth of gears of a planetary gear system, changes in operating conditions, such as increases or decreases in torque supplied to the sun gear of a planetary gear system of a propulsion system gearbox (e.g., a proprotor gearbox, a main rotor gearbox, or any other gearbox) can introduce the potential for misalignments between the gears. Such misalignments can cause loads to be disproportionately focused on a particular portion of teeth and/or bearing systems for the gears, which can cause increased wear and/or potential failure of teeth, gears, and/or bearing systems for a planetary gear system of a gearbox, thus causing overall gearbox failure.

One potential solution to account for potential misalignments between gears may include increasing the stiffness of the carrier and its carrier posts, which can limit potential misalignments. However, increasing the stiffness of the carrier increases its weight, which can impact performance of the planetary gear system and the aircraft. Another potential solution to account for potential misalignments between gears may include using spherical roller bearings within the bearing system for each planet gear of the planetary gear system. For a bearing system that includes spherical roller bearing, the bearings can rotate between a spherical-shaped inner race and a spherical-shaped outer race. As misalignments are introduced to the planetary gear system, the track of the spherical roller bearings can shift between the spherical-shaped inner and outer races to accommodate the misalignments.

Although spherical roller bearings provide for the ability to accommodate misalignments between gears of a planetary gear system, manufacturing complexity and cost of planetary gear systems that utilize spherical roller bearing systems are increased in comparison to planetary gear systems that utilize more conventional cylindrical roller bearings. For example, to form the spherical-shaped outer race for spherical roller bearings, rim material of planet gears is milled, which is both difficult and time-consuming, and results in increased manufacturing costs. Milling is also needed to form the spherical-shaped inner race, which further increases manufacturing costs. In addition, removing rim material from planet gears to form the spherical-shaped outer race causes decreased strength in the inner portion of the rim as compared to outer portions of the rim. More complex design criteria and manufacturing tolerances are needed to account for the decreased strength, which further increases manufacturing costs. Moreover, because spherical bearings are a sphere, during operation of a spherical roller bearing assembly, a spherical line that is the elliptical point of contact of the spherical roller bearings is carved into the inner and outer races of the assembly. As the bearings and the races wear, spalls develop and the gearbox eventually fails.

Another potential solution to accommodate potential misalignments is to develop pattern corrections for gear teeth of the gears of a planetary gear system. Pattern correction for gear teeth is typically designed to accommodate corrections for a narrow range of misalignment/torque. However, propulsion systems for aircraft such as tiltrotor aircraft 100 and rotorcraft 200 typically have a wide torque band that is to be supported during operation. Providing pattern correction for a wide range of misalignment/torque can increase design complexity of gearboxes, which can also increase manufacturing costs.

The present disclosure describes various embodiments that provide a spherical mounted cylindrical roller bearing system that includes a combined spherical bearing assembly and cylindrical roller bearing assembly for each planet gear of a planetary gear system. The spherical mounted cylindrical roller bearing system allows tilting movements of the bearing system, which may accommodate tilting movements of the planet gear with respect to the carrier post of the carrier, while also allowing rotational movements of the planet gear about a central axis of the carrier post and the planet gear. As discussed in further detail herein, spherical mounted cylindrical roller bearing systems as discussed for various embodiments described herein may provide numerous advantages over other potential solutions that attempt to account for misalignments in planetary gear systems.

Example embodiments associated with a spherical mounted cylindrical roller bearing system are described below with more particular reference to the remaining FIGS. Although example embodiments discussed herein are described with reference to tiltrotor aircraft 100 and rotorcraft 200, it should be appreciated that tiltrotor aircraft 100 of FIGS. 1A-1B and rotorcraft 200 of FIG. 2 are merely illustrative of a variety of aircraft in which spherical mounted cylindrical roller bearing systems may be used in accordance embodiments of the present disclosure. Other aircraft in which spherical mounted cylindrical roller bearing systems may be used can include, for example, fixed wing airplanes, hybrid aircraft, unmanned aircraft, gyrocopters, a variety of helicopter configurations, and drones, among other examples. Moreover, it should be appreciated that even though spherical mounted cylindrical roller bearing systems may be used in aircraft, bearing systems as discussed for various embodiments described herein may also be used in a variety of industries including, but not limited to, aerospace, non-aircraft transportation (e.g., boats, automobiles, busses, etc.), railway transportation, and/or any other industry.

Figure 4B:
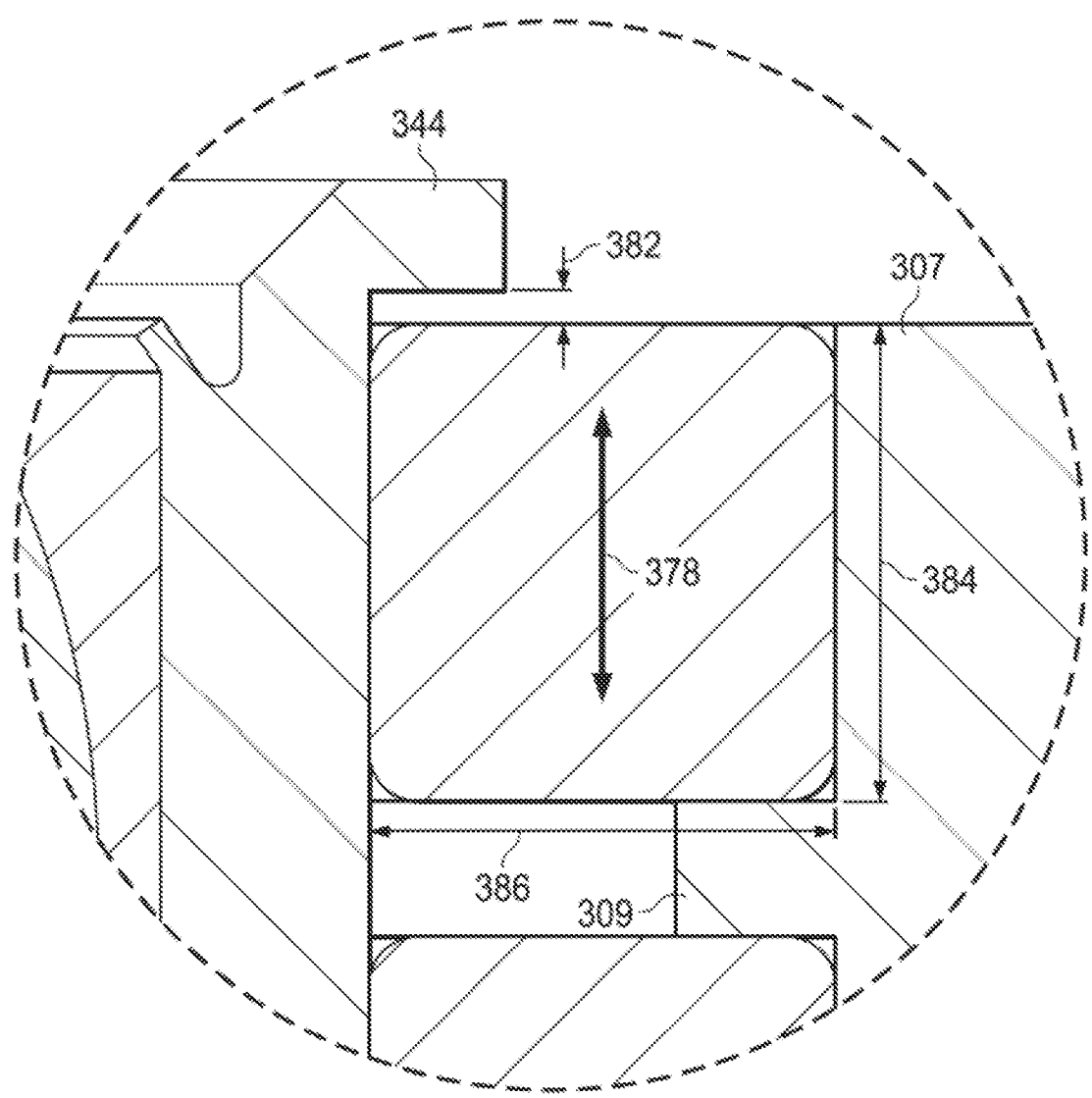

Referring to FIGS. 4A-4B, FIGS. 4A-4B are simplified diagrams illustrating example details associated with a particular spherical mounted cylindrical roller bearing system 312 for a particular planet gear 304 of planetary gear system 300, in accordance with certain embodiments. In particular, FIG. 4A is a simplified side, cross-sectional view diagram illustrating example details associated with the spherical mounted cylindrical roller bearing system 312 for the planet gear 304 and FIG. 4B is a simplified side, cross-sectional view diagram illustrating example features of a portion of the spherical mounted cylindrical roller bearing system 312, in accordance with certain embodiments. The cross-section of FIG. 4A is cut along a ling as generally indicated by the lines labeled '4A' in FIG. 3B.

In at least one embodiment, spherical mounted cylindrical roller bearing system 312 for planet gear 304 may include an inner bearing assembly 320, may include a spherical bearing 322 (sometimes referred to as a 'wobble' bearing) and an outer race 324, and an outer bearing assembly 330, which may include multiple cylindrical roller bearings 332, an inner race 334, and an outer race 336. As referred to herein in this Specification, the terms 'inner bearing assembly', 'inner spherical bearing assembly', 'spherical bearing assembly', and variations thereof may be used interchangeably and the terms 'outer bearing assembly', 'outer cylindrical roller bearing assembly', 'cylindrical roller bearing assembly', and variations thereof may be used interchangeably. Further as referred to herein in this Specification, a spherical mounted cylindrical roller bearing system (e.g., spherical mounted cylindrical roller bearing system 312) may be referred to more generally as a 'bearing system'.

Bearing system 312 may further include a race element 340 that is shared between the inner bearing assembly 320 and the outer bearing assembly 330. The race element may include an inner surface 342a and an outer surface 342b and may provide different functions in accordance with various embodiments. In one embodiment, the inner surface 342a of race element 340 may support and secure the outer race 324 to the spherical bearing 322 of the inner bearing assembly 320 via inner securing elements 348a and 348b that may be integrally formed for the inner surface 342a of the race element 340 and the outer surface 342b of race element 340 may provide the inner race 334 of the outer bearing assembly 330. In another embodiment, the outer race of the inner spherical bearing assembly may be formed integral to the race element 340 (e.g., a separate, non-integral outer race 324 for the inner bearing assembly 320 may not be needed) and the outer surface 342b of race element 340 may provide the inner race 334 of the outer bearing assembly 330.

In various embodiments, inner securing elements 348a and 348b of race element may be retaining lips, rings, shoulders, or any other structural element that may facilitate securing outer race 324 to spherical bearing 322 for inner bearing assembly 320.

Race element 340 may further include an outer shoulder 344 that may be integrally formed for the outer surface 342b. The outer shoulder 344 may be a structural feature of race element 340 that may help to maintain alignment of cylindrical roller bearings 332 with the inner race 334 for the outer bearing assembly 330. Race element 340 may further include an outer structural element 346 that is on a side of race element 340 opposite from outer shoulder 344. The outer structural element 346 may provide structural features for race element 340 upon which a bearing retaining device 356 for bearing system 312 may be secured (e.g., a shoulder and retaining features upon which bearing retaining device can be secured). In at least one embodiment, the bearing retaining device 356 may facilitate securing the outer bearing assembly 330 and gear 304 to the inner bearing assembly 320.

Spherical bearing 322 may have an inner diameter 326 that facilitates mounting the spherical bearing 322 (and bearing system 312) to the carrier post 310. Spherical bearing 322 for the inner bearing assembly 320 may be mounted to the carrier post 310 using a post retaining device 354 that is secured to the carrier post 310. In some embodiments, an inner spacer 350 and an outer spacer 352 may be provided on opposing sides of the spherical bearing 322 to facilitate suitable clearances for tilting movements (generally indicated by arrows 370) that may occur between the carrier post 310 and planet gear 304, which bearing system 312 may accommodate during operation of planetary gear system 300.

Planet gear 304 includes a rim 307 and teeth 305. In general, the rim 307 can be described as the material of which the planet gear 304 is composed that extends radially inward (e.g., towards the carrier post 310) from the root circle (comprising a root diameter) of the planet gear 304 to a first distance 311 at which the rim 307 material may provide the outer race 336 of the outer bearing assembly 330. Another portion of the rim 307 may extend radially inward from the root circle to a second distance 313 and may provide a shoulder 309 that may help, at least in part (e.g., along with a bearing cage of the cylindrical roller bearings), to maintain alignment and separation between the cylindrical roller bearings 332 for the outer race 336. More generally, the rim 307 is the material of the planet gear 304 that carries the planet gear teeth 305.

In various embodiments, post retaining device 354 and bearing retaining device 356 may be any device or combination of devices that may be used to secure the inner bearing assembly 320 and the outer bearing assembly 330 (and planet gear 304) to a corresponding structure (e.g., to the carrier post 310 for the post retaining device 354 or to the race element 340 for the bearing retaining device 356) and may include, but not be limited to, threaded rings, washers, spacers, tension clips or rings, lock clips or pins, combinations thereof, or the like. In various embodiments, outer structural element 346 may include threads, notches, holes, grooves, combinations thereof, and/or any other structural feature that may facilitate securing the bearing retaining device 356 to the race element 340.

Spherical bearing 322 may have a spherical diameter 380. Each cylindrical roller bearing 332 may have a length 384 and a diameter 386. In at least one embodiment, a length 390 of the inner race 334 of the outer bearing assembly 330 that is provided by the outer surface 342b of the race element 340 may be longer than the combined length of cylindrical roller bearings 332 included in the outer bearing assembly 330 plus a length 388 of the shoulder 309 of rim 307 in order to provide a clearance distance 382 that allows axial movements or shifting (generally indicated by arrows 378) of the cylindrical roller bearings 332 about the inner race 334, as may be needed during operation. It is to be understood that features and/or elements (e.g., races, bearings, race element 340, retaining devices, spacers, etc.) of spherical mounted cylindrical roller bearing systems 312 as discussed for various embodiments described herein may have any suitable dimensions, which may vary depending on applications and/or implementations (e.g., gear sizing, tooth for gears, carrier post sizing, torque loads and/or rotational speeds to be supported, bearing sizing, gear and/or carrier materials used, number of planet gears, etc.).

The spherical mounted cylindrical roller bearing system 312 may combine features provided by spherical bearing 322 with features provided by cylindrical roller bearings 332 to allow the bearing system 312 to both tilt in relation to carrier post 310, which may accommodate tilting movements 370 of the planet gear with respect to the carrier post 310, and to also allow rotational movements (generally indicated by arrows 372) of the planet gear 304 about a central axis (generally indicated by dashed-line 374) of the planet gear 304 and bearing system 312.

By accommodating tilting movements via the spherical bearing for each bearing system 312 mounted to each carrier post, each bearing system 312 for each planet gear 304 of planetary gear system 300 can advantageously maintain radial loading (generally indicated by arrows 376) on the cylindrical roller bearings (e.g., torque loads are reacted radially through the diameter of the cylindrical roller bearings and into the carrier), which allows numerous advantages to be realized over other potential solutions that attempt to accommodate misalignment in planetary gear systems.

One advantage of embodiments described herein may include providing a bearing system that can accommodate both tilting movements and rotational movements for a planet gear that does not implicate the design complexities and manufacturing costs that are associated with spherical roller bearing designs. One other advantage of embodiments described herein may include providing a bearing system that does not implicate the need for a stiff (and heavy) carrier for a planetary gear system, which can reduce manufacturing costs for a gearbox. One other advantage of embodiments described herein may include providing a bearing system that does not implicate the design complexities and manufacturing costs that are associated with providing pattern corrections for gear teeth.

Features and/or elements (e.g., races, bearings, race element 340, retaining devices, spacers, etc.) of spherical mounted cylindrical roller bearing systems 312 and planet gears 304 may be composed of any suitable material(s) including, but not limited to, a plastic, reinforced plastic, metal (e.g., aluminum, steel, etc.) and/or metal alloy, rubber, synthetic materials, fiberglass, reinforced fiberglass, ceramic materials, composite materials (e.g. a carbon composite such as a carbon fiber reinforced polymer (CFRP)), combinations thereof, or the like. In various embodiments, spherical mounted cylindrical roller bearing systems 312 may be formed using any suitable technique including, but not limited to, metal fabrication and/or machining techniques, combinations thereof, or the like.

Further, it is to be understood that the arrangement and/or configuration of features and/or elements of spherical mounted cylindrical roller bearing systems 312 are provided for illustrative purpose only and are not meant to limit the broad scope of the present disclosure. For example, a spherical mounted cylindrical roller bearing system may be adapted to be implemented for any other type of gear (other than a planet gear) and/or for any other type of gear system (other than a planetary gear system) in accordance with embodiments described herein. Other variations can be envisioned. Some of the features and/or elements illustrated in FIGS. 4A-4B are included in other ones of the remaining FIGS.; however, the discussion of these features and/or elements may not be repeated when discussing the remaining FIGS. for sake of brevity and any of these elements may take any of the forms disclosed herein.

Figure 5:
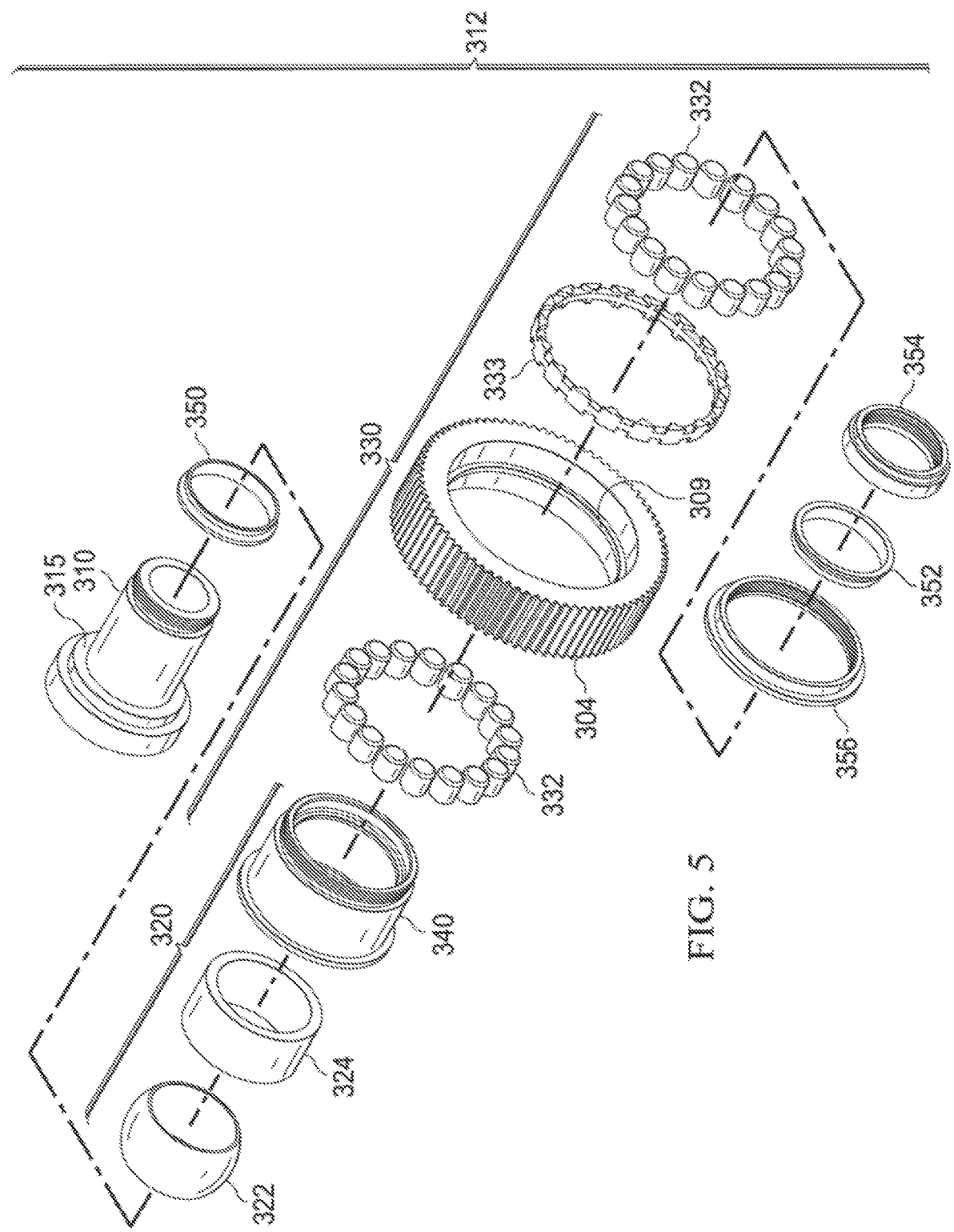
FIG. 5 is a simplified exploded view diagram illustrating yet other example details associated with the bearing system of FIGS. 4A-4B, in accordance with certain embodiments.

Referring to FIG. 5, FIG. 5 is a simplified exploded view diagram illustrating yet other example details associated with the spherical mounted cylindrical roller bearing systems 312 of planet gears 304 for planetary gear system 300, in accordance with certain embodiments. In at least one embodiment, a particular spherical mounted cylindrical roller bearing system 312 can be mounted to a particular carrier post 310 by providing inner spacer 350, which can be slid onto the carrier post 310 adjacent to a structural feature (e.g., a shoulder) 315 of the carrier post 310. As discussed herein for various embodiments described herein, inner bearing assembly 320 can include spherical bearing 322, race element 340 (also shared with the outer bearing assembly 330), and optionally outer race 324 (if it is not integrally formed into race element 340). Outer bearing assembly 330 can include cylindrical roller bearings 332, which may be housed in a bearing cage 333, planet gear 304, and race element 340 (also shared with inner bearing assembly 320).

In at least one embodiment, the inner bearing assembly 320 and the outer bearing assembly 330 can be assembled and secured together as a packaged system using bearing retaining device 356 to form spherical mounted cylindrical roller bearing system 312 In such an embodiment, once bearing system 312 is assembled, it can be mounted to carrier post 310, in which case the spherical bearing 322 can be slid over the carrier post 310 adjacent to inner spacer 350, outer spacer 352 can be slid over the carrier post 310, and the bearing system 312 can be secured to the carrier post 310 using post retaining device 354.

Figure 6:
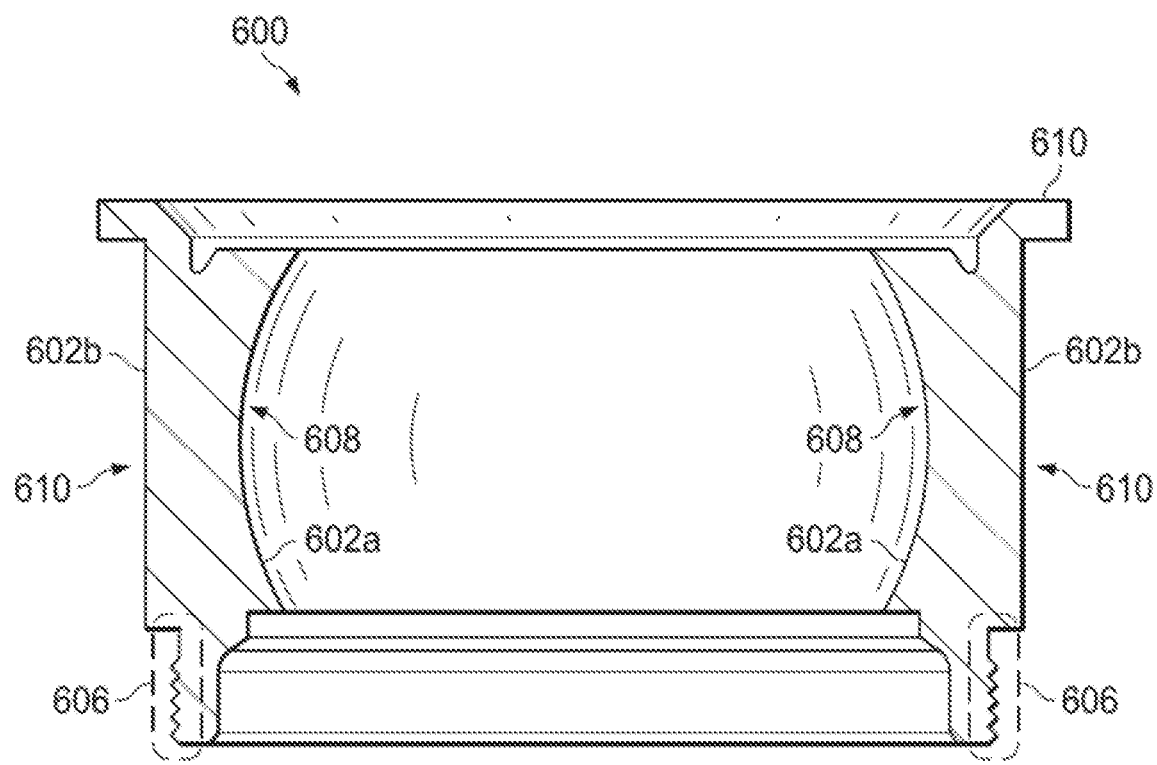
FIG. 6 is a simplified side, cross-sectional view diagram illustrating example details associated with an example race element, in accordance with certain embodiments.

Referring to FIG. 6, FIG. 6 is a simplified side, cross-sectional view diagram illustrating example details associated with an example race element 600 that may be used in a spherical mounted cylindrical roller bearing system, in accordance with certain embodiments. As illustrated in the embodiment of FIG. 6, race element 600 may include similar features to race element 340, shown at least in FIG. 4A, in that race element 600 may include an inner surface 602a, an outer surface 602b, an outer shoulder 604, and an outer structural element 606 upon which a bearing retaining device can be secured. The outer surface 602b can provide an inner race 610 for an outer bearing assembly and an outer (spherical) race 608 for an inner bearing assembly can be formed for the inner surface 602a of the race element 600. The outer race 608 can mate with a spherical bearing for the inner bearing assembly of a given spherical mounted cylindrical roller bearing system, in accordance with embodiments described herein. In some embodiments, the outer race 608 can be formed for the inner surface 602a of the race element, by milling or otherwise machining the race element 600 to include spherical features for the race; however, in some embodiments, the race element 600 may be cast or otherwise molded as a single element that includes the outer race 608 integrally formed therein.

It is to be understood that the example arrangements and/or configurations of various features and/or elements associated with a spherical mounted cylindrical roller bearing system discussed in FIGS. 4A-4B, 5, and 6 are only a few of the many possible arrangements and/or configurations of features and/or elements that may be provided for such bearing systems and are not meant to limit the broad scope of the present disclosure. Virtually any arrangement and/or configuration of features and/or elements may be provided for a spherical mounted cylindrical roller bearing system and, thus, are clearly within the scope of the present disclosure.

The diagrams in the FIGS. illustrate the architecture, functionality, methods, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A planetary gear system, comprising:
   a planet gear further comprising a bearing system, the bearing system further comprising:
   an inner bearing assembly comprising a spherical bearing and an outer race;
   an outer bearing assembly comprising a plurality of cylindrical roller bearings, an inner race, and an outer race; and
   a race element comprising an inner surface and an outer surface, wherein the outer surface of the race element is the inner race for the outer bearing assembly and the inner surface of the race element is associated with the outer race for the inner bearing assembly.

2. The planetary gear system of claim 1, wherein the inner bearing assembly allows tilting movements of the planet gear.

3. The planetary gear system of claim 1, wherein the outer bearing assembly allows rotational movements for the planet gear and supports, at least in part, radial loads for the planet gear.

4. The planetary gear system of claim 1, wherein the outer race of the inner bearing assembly is integral with the race element.

5. The planetary gear system of claim 1, wherein the outer race for the outer bearing assembly is backup material of the planet gear.

6. The planetary gear system of claim 1, wherein the race element further comprises:
   an outer shoulder associated with the outer surface of the race element that maintains alignment of the plurality of cylindrical roller bearings with the inner race of the outer bearing assembly; and
   an outer structural element associated with the outer surface of the race element that is to receive a retaining device.

7. The planetary gear system of claim 6, wherein the retaining device secures the plurality of cylindrical roller bearings to the inner race of the outer bearing assembly and wherein the inner race of the outer bearing assembly provides a clearance distance that allows axial movements of the plurality of cylindrical roller bearings along the inner race.

8. The planetary gear system of claim 1, wherein the spherical bearing comprises an inner diameter to facilitate mounting the bearing system on a post.

9. The planetary gear system of claim 1, further comprising a carrier that comprises a plurality of carrier posts.

10. The planetary gear system of claim 9, further comprising:
    a sun gear;
    a ring gear, wherein the planet gear is one of a plurality planet gears of the planetary gear system, wherein each planet gear is mounted to each carrier post of the plurality of carrier posts.

11. An aircraft, comprising:
a fuselage; and
at least one propulsion system, the at least one propulsion system comprising at least one planetary gear system, the at least one planetary gear system further comprising a plurality of planet gears, wherein each planet gear further comprises a bearing system, the bearing system of each planet gear further comprising:
an inner bearing assembly comprising a spherical bearing and an outer race;
an outer bearing assembly comprising a plurality of cylindrical roller bearings, an inner race, and an outer race; and
a race element comprising an inner surface and an outer surface, wherein the outer surface of the race element is the inner race for the outer bearing assembly and the inner surface of the race element is associated with the outer race for the inner bearing assembly.

12. The aircraft of claim 11, wherein the inner bearing assembly of each bearing system allows tilting movements for each planet gear.

13. The aircraft of claim 11, wherein the outer bearing assembly of each bearing system allows rotational movements for each planet gear and supports, at least in part, radial loads for each planet gear.

14. The aircraft of claim 11, wherein the aircraft is a tiltrotor aircraft comprising at least two propulsion systems having proprotors that are moveable between a helicopter mode and an airplane mode.

15. The aircraft of claim 11, wherein the aircraft is a rotorcraft.

16. The aircraft of claim 11, wherein the outer race of the inner bearing assembly is integral with the race element.

17. The aircraft of claim 11, wherein the outer race for the outer bearing assembly is backup material of the planet gear.

18. The aircraft of claim 11, wherein the race element further comprises:
an outer shoulder associated with the outer surface of the race element that maintains alignment of the plurality of cylindrical roller bearings with the inner race of the outer bearing assembly; and
an outer structural element associated with the outer surface of the race element that is to receive a retaining device.

19. The aircraft of claim 18, wherein the retaining device secures the plurality of cylindrical roller bearings to the inner race of the outer bearing assembly and wherein the inner race of the outer bearing assembly provides a clearance distance that allows axial movements of the plurality of cylindrical roller bearings along the inner race.

20. The aircraft of claim 11, wherein the spherical bearing comprises an inner diameter to facilitate mounting the bearing system on a post.

* * * * *